US008256221B2

(12) United States Patent
Rubio et al.

(10) Patent No.: US 8,256,221 B2
(45) Date of Patent: Sep. 4, 2012

(54) CONCENTRIC TUBE SUPPORT ASSEMBLY

(75) Inventors: Mark F. Rubio, Orlando, FL (US); John C. Glessner, King Mills, OH (US)

(73) Assignee: Siemens Energy, Inc., Orlando, FL (US)

( * ) Notice: Subject to any disclaimer, the term of this patent is extended or adjusted under 35 U.S.C. 154(b) by 1552 days.

(21) Appl. No.: 11/784,149

(22) Filed: Apr. 5, 2007

(65) Prior Publication Data
US 2009/0301598 A1 Dec. 10, 2009

(51) Int. Cl.
*F23D 3/40* (2006.01)
*F02C 1/00* (2006.01)
(52) U.S. Cl. ............ 60/723; 60/39.822; 431/7; 431/170
(58) Field of Classification Search .................. 60/723, 60/39.822; 431/7, 170, 268, 326, 328
See application file for complete search history.

(56) References Cited

U.S. PATENT DOCUMENTS

| 4,162,993 | A | 7/1979 | Retallick |
|---|---|---|---|
| 4,240,784 | A | 12/1980 | Dauvergne |
| 4,265,085 | A | 5/1981 | Fox et al. |
| 4,350,617 | A | 9/1982 | Retallick et al. |
| 4,545,430 | A | 10/1985 | Retallick |
| 4,598,063 | A | 7/1986 | Retallick |
| 4,870,824 | A | 10/1989 | Young et al. |
| 5,060,721 | A | 10/1991 | Darragh |
| 5,278,125 | A | 1/1994 | Iida et al. |
| 5,368,475 | A | 11/1994 | Suppiah et al. |
| 5,406,704 | A | 4/1995 | Retallick |
| 5,461,864 | A | 10/1995 | Betta et al. |
| 5,525,309 | A | 6/1996 | Breuer et al. |
| 5,865,864 | A | 2/1999 | Bruck |
| 5,946,917 | A | 9/1999 | Hums et al. |
| 6,060,173 | A | 5/2000 | Retallick |
| 6,116,014 | A | 9/2000 | Dalla Betta et al. |
| 6,158,222 | A | 12/2000 | Retallick |
| 6,174,159 | B1 | 1/2001 | Smith et al. |
| 6,190,784 | B1 | 2/2001 | Maus et al. |
| 6,217,832 | B1 | 4/2001 | Betta et al. |
| 6,358,040 | B1 | 3/2002 | Pfefferle et al. |
| 6,500,393 | B2 | 12/2002 | Nakamori et al. |
| 6,619,043 | B2 | 9/2003 | Bruck et al. |
| 6,630,423 | B2 | 10/2003 | Alvin et al. |
| 6,996,990 | B2 * | 2/2006 | Dinu ............................... 60/723 |
| 2002/0182551 | A1 | 12/2002 | Carroni et al. |

* cited by examiner

*Primary Examiner* — Ehud Gartenberg
*Assistant Examiner* — Arun Goyal (57) ABSTRACT

An assembly (45) includes a plurality of separate pie-shaped segments (72) forming a disk (70) around a central region (48) for retaining a plurality of tubes (46) in a concentrically spaced apart configuration. Each segment includes a support member (94) radially extending along an upstream face (96) of the segment and a plurality of annularly curved support arms (98) transversely attached to the support member and radially spaced apart from one another away from the central region for receiving respective upstream end portions of the tubes in arc-shaped spaces (100) between the arms. Each segment also includes a radial passageway (102) formed in the support member for receiving a fluid segment portion (106) and a plurality of annular passageways (104) formed in the support arms for receiving respective arm portions (108) of the fluid segment portion from the radial passageway and for conducting the respective arm portions into corresponding annular spaces (47) formed between the tubes retained by the disk.

26 Claims, 8 Drawing Sheets

CONCENTRIC TUBE SUPPORT ASSEMBLY

STATEMENT REGARDING FEDERALLY SPONSORED DEVELOPMENT

Development for this invention was supported in part by Contract No. DE-FC-26-03NT41891, awarded by the United States Department of Energy. Accordingly, the United States Government may have certain rights in this invention.

FIELD OF THE INVENTION

This invention relates generally to gas turbine engines, and, in particular, to a concentric tube support assembly for a combustor of a gas turbine engine.

BACKGROUND OF THE INVENTION

It is known to use catalytic combustion in gas turbine engines to reduce NOx emissions. One such catalytic combustion technique known as lean catalytic, lean burn (LCL) combustion, involves completely mixing fuel and air to form a lean fuel mixture that is passed over a catalytically active surface prior to introduction into a downstream combustion zone. However, the LCL technique requires precise control of fuel and air volumes and may require the use of a complex preburner to bring the fuel/air mixture to lightoff conditions. An alternative catalytic combustion technique is the rich catalytic, lean burn (RCL) combustion process that includes mixing fuel with a first portion of air to form a rich fuel mixture. The rich fuel mixture is passed over a catalytic surface and mixed with a second portion of air in a downstream combustion zone to complete the combustion process.

U.S. Pat. No. 6,174,159 describes an RCL method and apparatus for a gas turbine engine having a catalytic combustor using a backside cooled design. The catalytic combustor includes a plurality of catalytic modules comprising multiple cooling conduits, such as tubes, coated on an outside diameter with a catalytic material and supported in the catalytic combustor. A portion of a fuel/oxidant mixture is passed over the catalyst coated cooling conduits and is oxidized, while simultaneously, a portion of the fuel/oxidant enters the multiple cooling conduits and cools the catalyst. The exothermally catalyzed fluid then exits the catalytic combustion system and is mixed with the cooling fluid outside the system, creating a heated, combustible mixture. To reduce the complexity and maintenance costs associated with catalytic modules used in catalytic combustors, simplified designs are needed.

BRIEF DESCRIPTION OF THE DRAWINGS

The invention will be more apparent from the following description in view of the drawings that show.

DETAILED DESCRIPTION OF THE INVENTION

Figure 1:
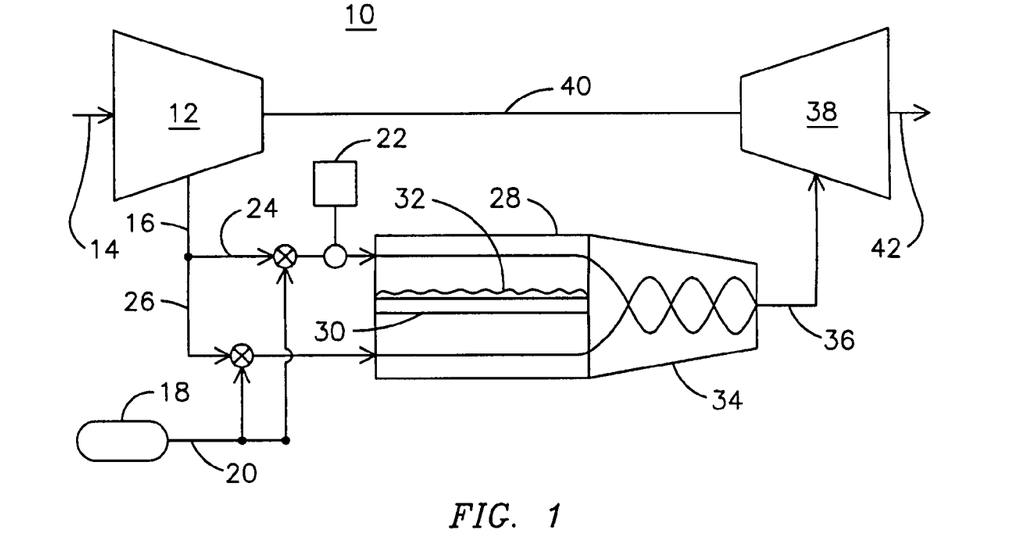
FIG. 1 is a functional diagram of a gas turbine engine including a catalytic combustor.

FIG. 1 illustrates a gas turbine engine 10 having a compressor 12 for receiving a flow of filtered ambient air 14 and for producing a flow of compressed air 16. The compressed air 16 is separated into a combustion mixture fluid flow 24 and a cooling fluid flow 26, respectively, for introduction into a catalytic combustor 28. The combustion mixture fluid flow 24 is mixed with a flow of a combustible fuel 20, such as natural gas or fuel oil for example, provided by a fuel source 18, prior to introduction into the catalytic combustor 28. The cooling fluid flow 26 may be introduced directly into the catalytic combustor 28 without mixing with a combustible fuel. Optionally, the cooling fluid flow 26 may be mixed with a flow of combustible fuel 20 before being directed into the catalytic combustor 28. A combustion mixture flow controller 22 may be used to control the amount of the combustion mixture fluid flow provided to the catalytic combustor 28 responsive to a gas turbine load condition.

Inside the catalytic combustor 28, the combustion mixture fluid flow 24 and the cooling fluid flow 26 are separated by a pressure boundary element 30. In an aspect of the invention, the pressure boundary element 30 is coated with a catalytic material 32 on the side exposed to the combustion mixture fluid flow 24. The catalytic material 32 may have, as an active ingredient, precious metals, Group VIII noble metals, base metals, metal oxides, or any combination thereof. Elements such as zirconium, vanadium, chromium, manganese, copper, platinum, palladium, osmium, iridium, rhodium, cerium, lanthanum, other elements of the lanthanide series, cobalt, nickel, iron, and the like may be used.

In a backside cooling embodiment, the opposite side of the pressure boundary element 30 confines the cooling fluid flow 26. While exposed to the catalytic material 32, the combustion mixture fluid flow 24 is oxidized in an exothermic reaction, and the catalytic material 32 and the pressure boundary element 30 are cooled by the unreacted cooling fluid flow 26, thereby absorbing a portion of the heat produced by the exothermic reaction.

After the flows 24, 26 exit the catalytic combustor 28, the flows 24, 26 are mixed and combusted in a plenum or combustion completion stage 34, to produce a hot combustion gas 36. The hot combustion gas 36 is received by a turbine 38, where it is expanded to extract mechanical shaft power. In one embodiment, a common shaft 40 interconnects the turbine 38 with the compressor 12 as well as an electrical generator (not shown) to provide mechanical power for compressing the ambient air 14 and for producing electrical power, respectively. The expanded combustion gas 42 may be exhausted directly to the atmosphere or it may be routed through additional heat recovery systems (not shown).

Catalytic combustors having a plurality of concentrically arranged catalyst coated tubes having been proposed. One such concentric tube design is described in commonly assigned US Published patent application 2006/0032227 A1, incorporated herein by reference. Such a concentric catalytic combustor may include a plurality of concentric tubes radially spaced apart around a central core region to form annular spaces conducting fluid flows therethrough. A catalytic material is disposed in at least one of the spaces and is exposed to a fluid, such as a fuel/oxidizer mixture, flowing therethrough. For backside cooling, an adjacent annular space may conduct a different fluid, such an oxidizer, therethrough to moderate a temperature increase due to partial combustion of the fuel/oxidizer mixture flowing in the space having a catalytic material disposed therein. Accordingly, the tubes act as a heat exchanger for the catalytic reaction and such a design may be used for any heat exchanging application and/or other applications such as filtration. A manifold may be provided at an upstream end of the tube for supporting the tubes in a concentric configuration and directing the appropriate fluids into the spaces between the tubes. In the past, the tubes of such concentric catalytic combustors may have been attached to the manifold at an upstream end using permanent fastening techniques, such as welding or brazing, which may have limited a spacing distance between the tubes to an undesirably large distance sufficient for allowing for attachment of the tubes to the manifold. In addition, inspection and replacement of selected tubes may not be possible without destroying the assembly.

Figure 2:
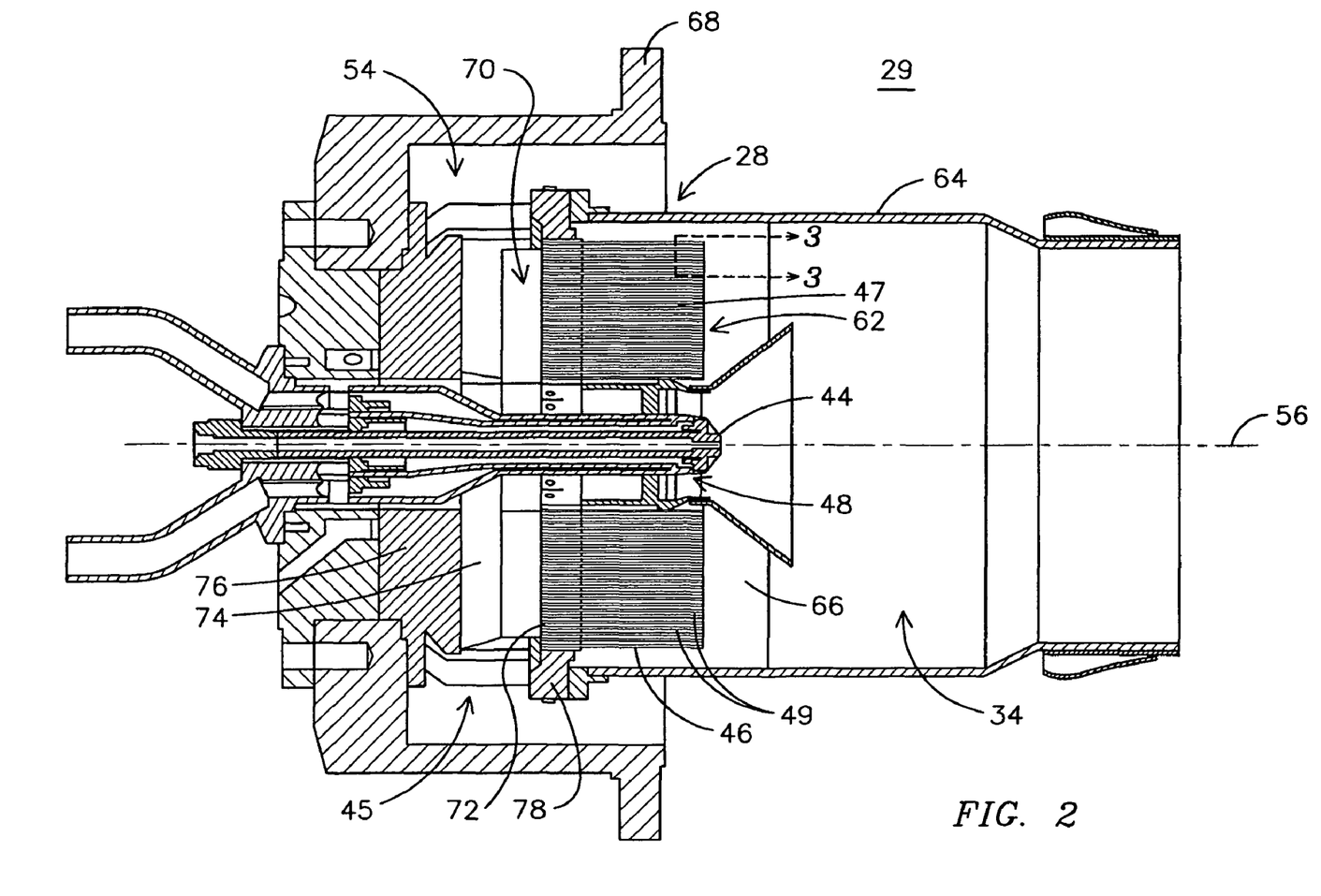
FIG. 2 is a longitudinal cross-sectional view of a concentric catalytic combustor basket having an improved assembly for supporting pressure boundary elements.

FIG. 2 illustrates a longitudinal cross-sectional view of a concentric catalytic combustor basket 29 having an improved assembly 45 for supporting pressure boundary elements, such as tubes 46, and for directing fluid flows into spaces between the tubes 46. In an example embodiment, the catalytic combustor 28 may include a plurality of concentric tubes 46 arranged around a central core region 48 to form annular spaces 47, 49 between the tubes 46 for conducting respective fluid flows therethrough. As used herein, the term "concentric" includes tubes 46 centered around the central region 48, not just about a central axis 56. Accordingly, the tubes 46 may be offset from one another so that an annular space formed there between may not be a symmetrical annular space. The term "tube" is meant to include an element defining a flow channel having a circular, rectangular, hexagonal or other geometric cross section. "Annular space" is meant to refer to a peripheral space defined between a first tube and a second tube disposed around and spaced away from the first tube, such as a tube having a circular cross section (e.g., a cylindrical element), concentrically disposed around another cylindrical element to form a peripheral space there between.

Figure 3:
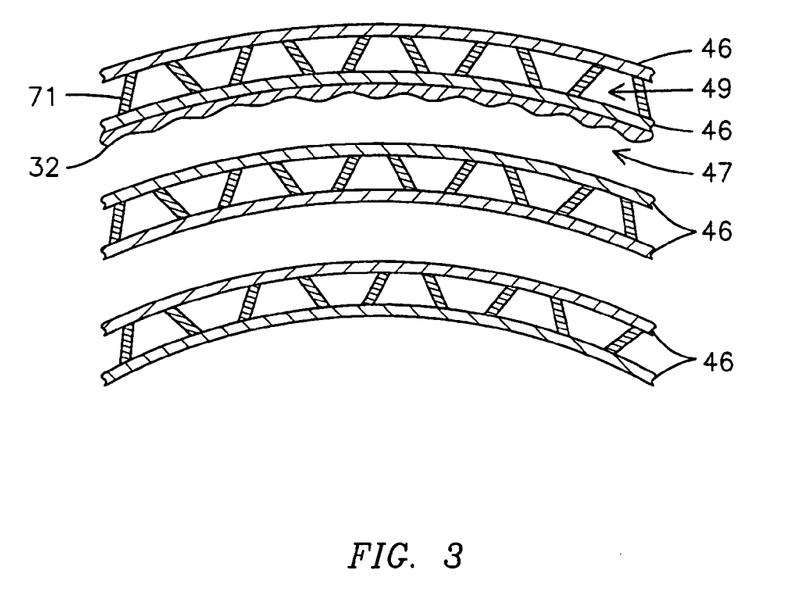
FIG. 3 shows a partial cross-section of the concentric tubes taken along line 3-3 of FIG. 2.

FIG. 3 shows a partial cross-section of the concentric tubes 46 taken along line 3-3 of FIG. 2. The catalytic combustor 28 includes at least one annular space 47 for conducting a first fluid flow therethrough and a second annular space 49, separate from annular space 47, for conducting a second fluid flow therethrough. A catalytic material 32 may be disposed in at least one of the spaces 47, 49 for exposure to the corresponding fluid flowing therethrough. To provide improved structural rigidity between at least some of the tubes 46, a support structure 71 may be radially disposed between at least some concentrically adjacent pressure boundary elements 46 within an annular space, such as space 49, defined between tubes 46. The support structure 71 radially retains the adjacent tubes 46 in a spaced configuration. In an example embodiment, the support structure 71 may include a corrugated element brazed or welded to one or both of the tubes 46 and may extend along an axial length of the tubes 46. In other embodiments, the support structure may include fins or tubular elements disposed in the annular space 49 between two adjacent tubes 46. The support structure may be disposed in cooling spaces and/or catalytically active spaces. In another aspect, the support structure 71 may include a catalytic material 32.

Returning to FIG. 2, the combustor 28 may include an assembly 45 at an upstream end 54 of the combustor 28 for retaining the tubes 46 and receiving and directing fluid flows into the annular spaces 47, 49 between the tubes 46. The assembly 45 may include a disk 70 comprising a plurality of pie-shaped segments 72 for retaining the tubes 46 in a concentrically spaced apart arrangement. The assembly 45 may also include a flow directing element extension 74 associated with each segment 72, a flow distribution element 76, and a retainer ring 78 for at least partially retaining the segments 72. A combustor liner 64 and/or a tube protective sleeve 66 may be attached to a periphery of the assembly such as to the retainer ring 78. An upstream end of the assembly 45 may be may be attached, such as by bolting, to a top hat 68 to form a preassembled basket 29, for example, configured for installation into a conventional gas turbine engine without need of modification to the engine. A pilot burner 44 may be disposed in the central region 48 to provide a pilot flame for stabilizing flames in the combustion completion stage 34 under various engine loading conditions.

Figure 4:
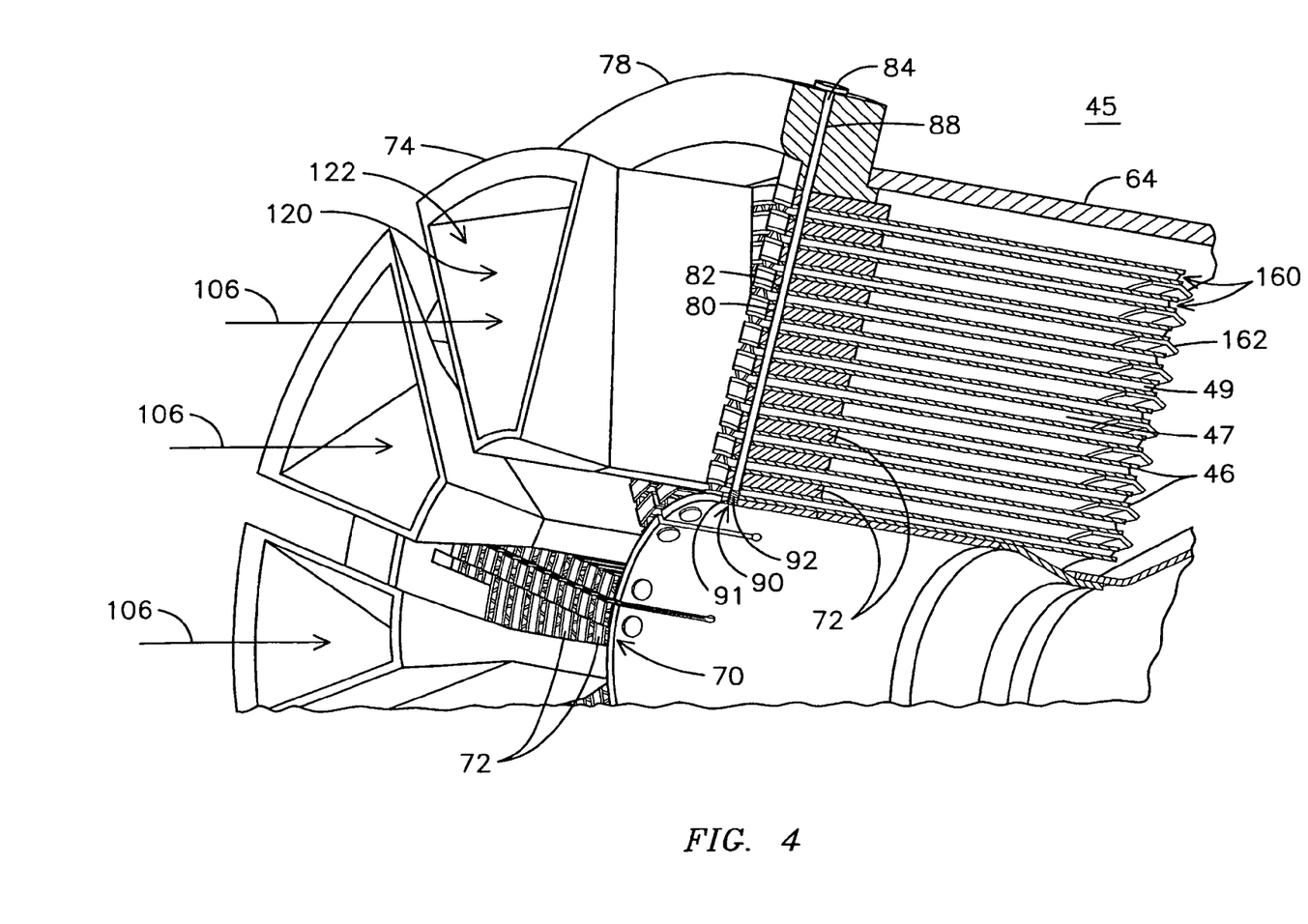
FIG. 4 is a perspective view, partially cut away, of an upper portion of the assembly of FIG. 2 viewed at an angle offset from longitudinal axis of the assembly.
Figure 5:
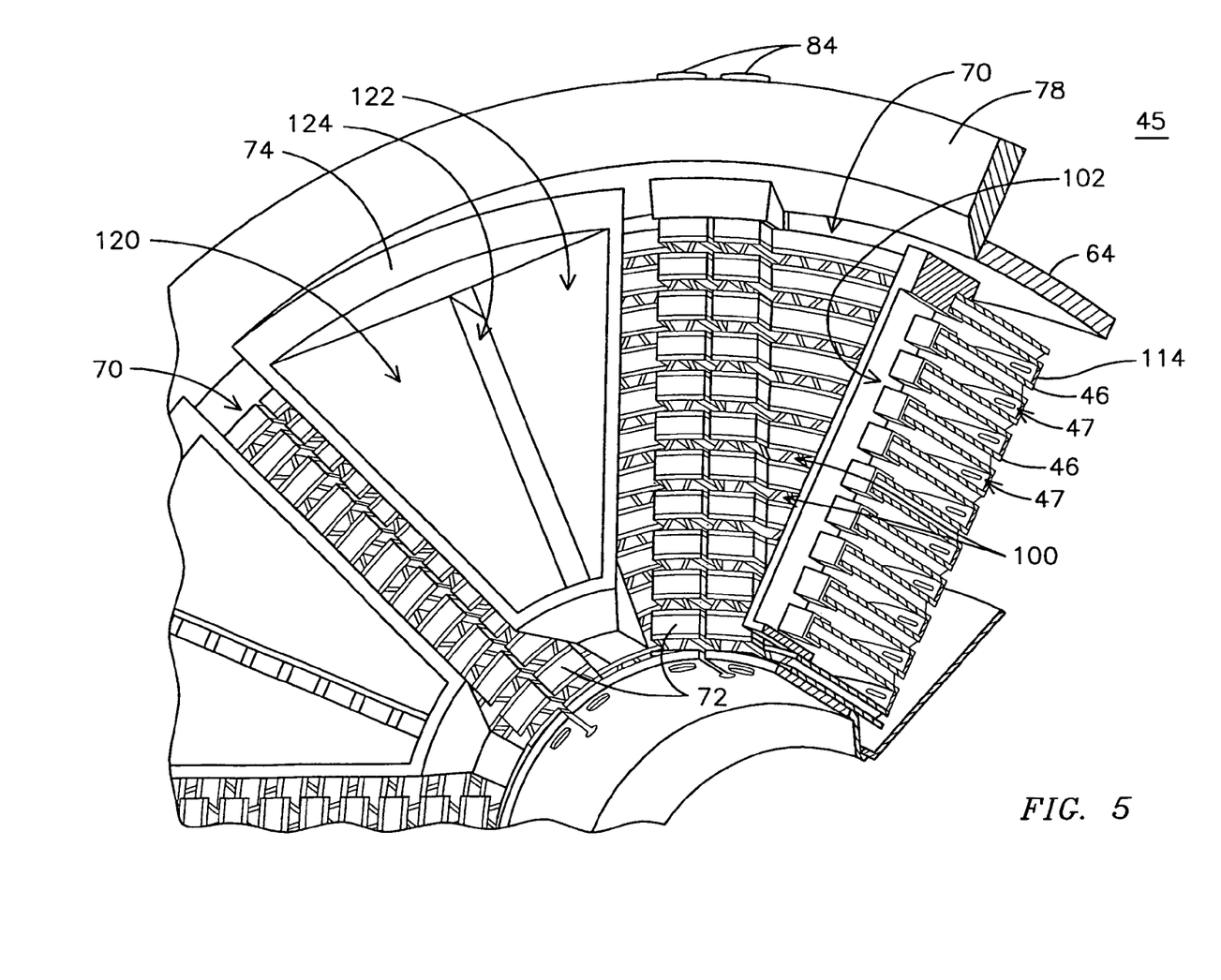
FIG. 5 is a perspective view, partially cut away, of an upper portion of the assembly of FIG. 2 viewed at another angle offset from longitudinal axis of the assembly.

FIGS. 4 and 5 are perspective views respectively, partially cut away, of an upper portion of the assembly 45 showing in more detail certain elements of an example embodiment of the invention. FIG. 4 depicts an upper portion of the assembly 45 viewed at a relatively smaller offset angle away from a longitudinal direction and FIG. 5 depicts an upper portion of the assembly 45 viewed at a relatively larger offset angle away from a longitudinal direction. As shown in FIG. 4, segments 72 include radially aligned segment openings 80 formed therethrough. In addition, the tubes 46 include radially aligned tube openings 82 formed in upstream end portions of the tubes 46 corresponding to the radially aligned segment openings 82 of the segments 72 when the upstream end portions of the tubes 46 are disposed within the segments 72.

A retainer 84, such as a bolt, may be provided for securing the tubes 46 through the radially aligned segment openings 80 and the radially aligned tube openings 82. The retainer may also act to retain the segments 72 in the disk 70. One of the tubes 46, such as a radially inner most tube 46, may include a fastening structure 90 for securing the retainer 84 in the radially aligned segment openings 80 and the radially aligned tube openings 82. For example, the fastening structure 90 may include a first threaded region 91 formed in at least one of the radially aligned tube openings 82. The retainer 84 may include a second threaded region 92 for engagement with the first threaded region 91 of the radially aligned tube opening 82 to allow securing the retainer 78 therein. Of course, other types of retainers and fastening structures known in the art may be used to retain the tubes 46 in the disk 70 via the openings 80, 82. The combination of the pie-shaped segments 72, the tubes 46, the retainers 84, and the fastening structure 90 provides a serviceable assembly that allows non-destructive disassembly of the components for repair and/or replacement.

The retaining ring 78 may be disposed radially outward of the disk 70 and include radially aligned ring openings 88 formed in the ring 78 corresponding to the radially aligned segment openings 80 and the radially aligned tube openings 82. The radially aligned ring openings 88 may be configured for receiving the retainers 84 therethrough for at least partially retaining the segments 72 in the disk 70.

In an example embodiment depicted in FIG. 4, exit ends 160 of the tubes 46 may be configured for partially restricting an exit opening between the tubes 46 for increasing a velocity of fluid exiting spaces 47 between the tubes 46. For example, the tubes 46 may include one or more flow restrictors 162 extending into the spaces 47 between the tubes 46. The flow restrictors 162 may include separate elements attached to one or more exit ends 160 of the tubes 46, or may be integrally formed in one or more exit ends 160 of the tubes 46. In an example embodiment, the flow restrictors 162 may be angled into the spaces 47 between the tubes 46 such as by about a 45 degree angle.

Figure 9:
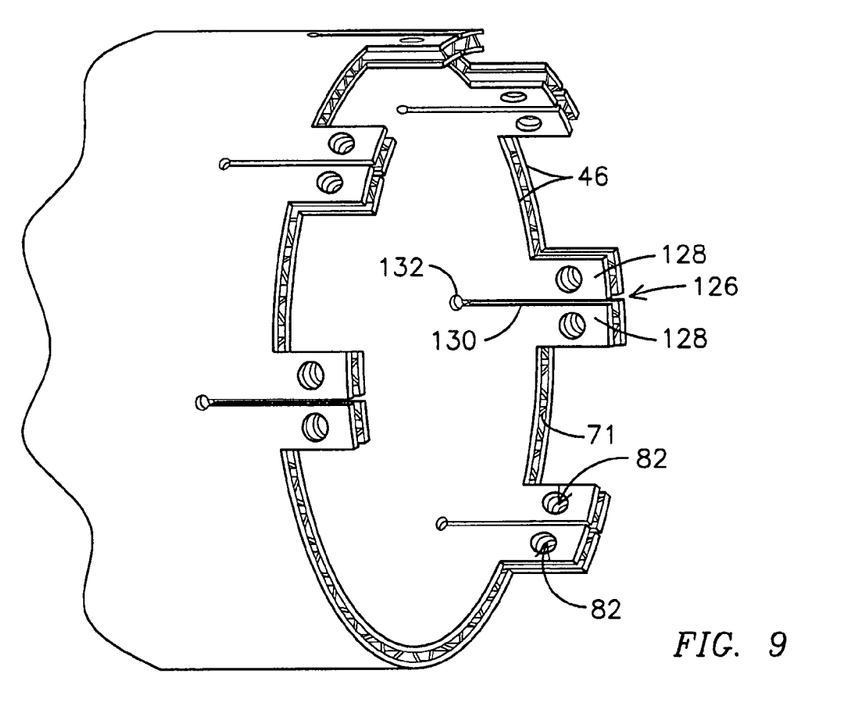
FIG. 9 is a partial perspective view of exemplary upstream end portions of two adjacent tubes radially retained in a spaced apart configuration by a support structure.

FIG. 9 shows a partial perspective view of exemplary upstream end portions of two adjacent tubes 46 that can be radially retained in a spaced apart configuration by the support structure 71. In the depicted example embodiment, the upstream end portions of the tubes 46 comprise a plurality of circumferentially spaced apart tabs 126. The radially aligned tube openings 82 may be formed in the tabs 126. In an example aspect of the invention, at least two of the radially aligned tube openings 82 are formed in each tab 126, wherein each one of the openings 82 may be associated with a different one of the segments 72. Consequently, the tabs 126, in conjunction with the retainer 84, act to partially retain the segments 72 in the disk 70 when the tube 46 is assembled to the disk 70. The tabs 126 may be sufficiently long enough to extend into the segments 72 so that the segment openings 80 and the tube openings 82 align to allow insertion of the retainer 84 through the aligned openings 80, 82.

In an embodiment, the tabs 126 comprise at least two tab portions 128 separated by a longitudinal slot 130 therebetween for allowing movement of the tab portions 130 relative to each other. For example, the slot 130 may be configured to allow sufficient movement for easing assembly of the tubes 46 into the disk 70 and insertion of the retainers 84. The longitudinal slot 130 may also include a stress relieving structure 132 proximate a bottom of the slot 130, such as a circularly enlarged region or other configuration know to relieve stress. As shown in FIG. 9, the slot 130 may extend longitudinally into the tube 46 further than a longitudinal length of the tab 126.

Figure 6:
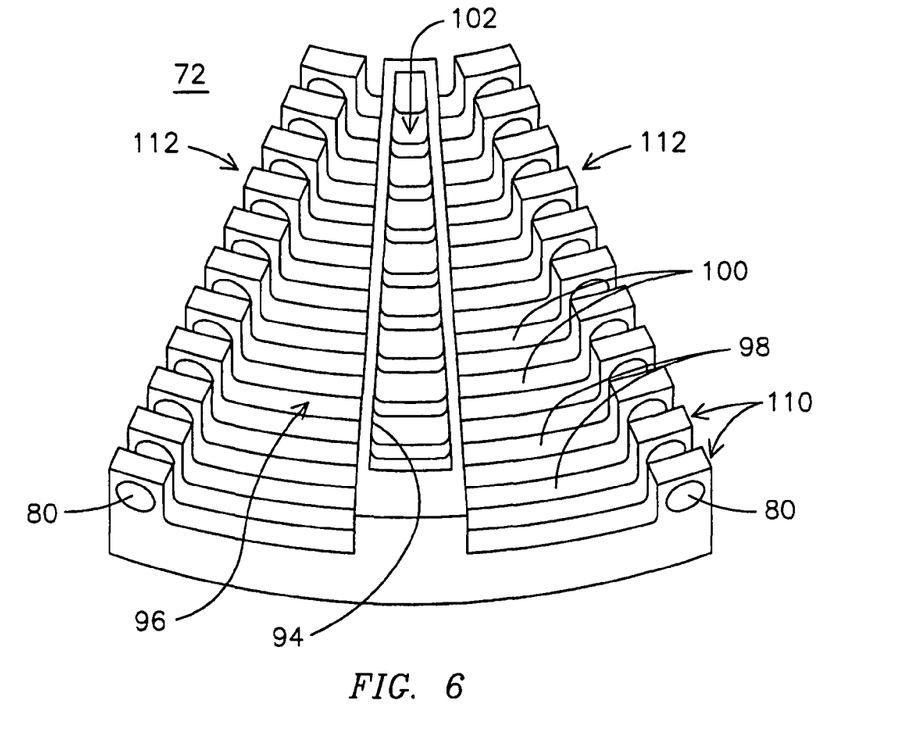
FIG. 6 is a perspective views an example segment of the assembly of FIG. 2 viewed from an upstream side.
Figure 7:
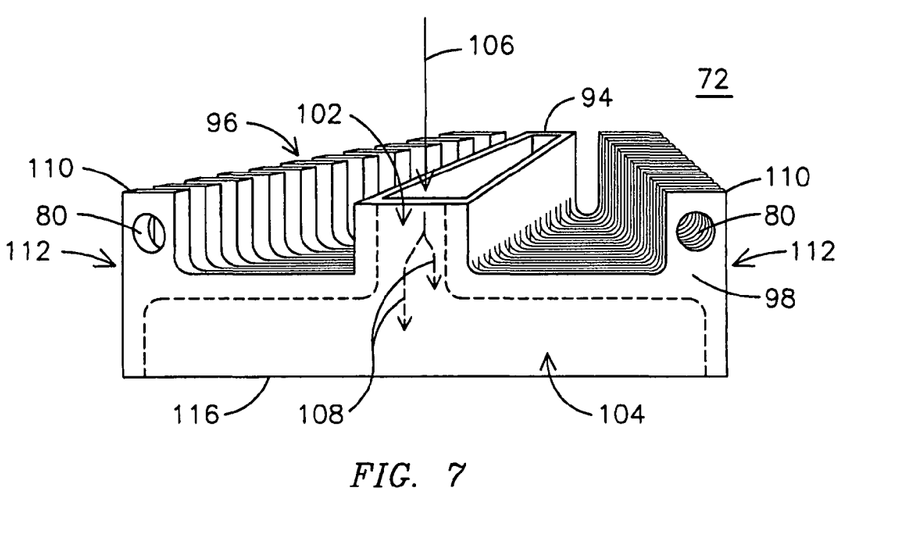
FIG. 7 is a perspective views an example segment of the assembly of FIG. 2 viewed from a radially outermost end.
Figure 8:
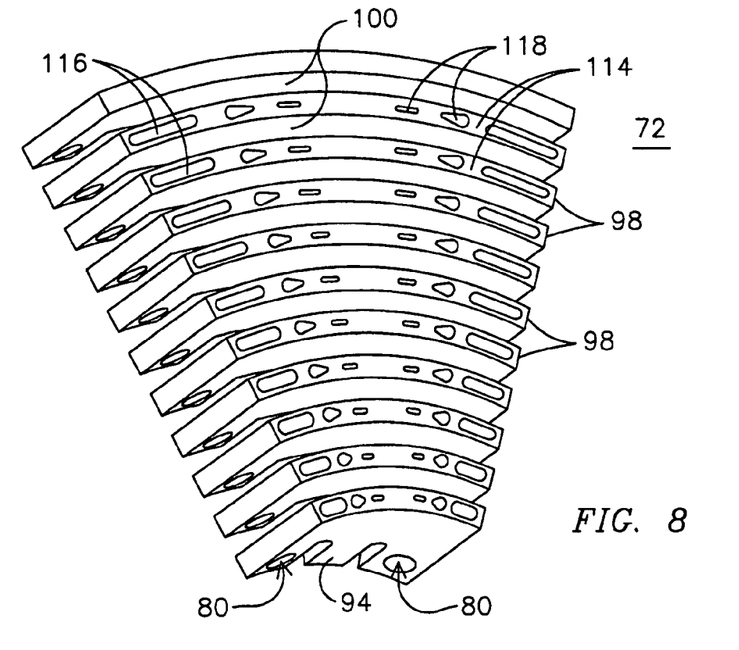
FIG. 8 is a perspective views an example segment of the assembly of FIG. 2 viewed from a downstream side.

FIGS. 6, 7, and 8 show perspective views of an example segment 72 of the assembly 45 viewed from an upstream side, a radially outermost end, and a downstream side, respectively. As shown in FIGS. 6, 7, and 8, the segment 72 may include a support member 94 radially extending along an upstream face 96 of the segment 72. The segment 72 may also include a plurality of annular support arms 98 transversely attached to the support member 94 and radially spaced apart from one another to define arc-shaped spaces 100 therebetween. As can be seen in FIG. 5, the spaces 100 defined between the arms 98 are configured for receiving respective upstream end portions of the tubes 46 therein.

The segment 72 includes a radial passageway 102 formed in the support member 94 for receiving a fluid segment portion 106 of a first fluid flow, such as a fuel/oxidizer or combustion mixture. The segment 72 may also include a plurality of annular passageways 104, as indcted by the dashed line of FIG. 7, formed in the support arms for receiving respective arm portions 108 of the fluid segment portion 106 from the radial passageway 102 and for conducting the respective arm portions 108 into corresponding annular spaces 47 formed between the tubes 46 retained by the disk 70. Conceptually, the segment 72 may be thought of as a Christmas tree having a trunk (i.e., the support member 94) and multiple branches extending from the trunk (i.e., the arms 98). The trunk receives a fluid flow (i.e., the fluid segment portion 106) and distributes respective portions of the fluid flow (i.e., the arm portions 108) throughout the branches.

As can be seen in FIGS. 5 and 8, at least some of the arms 98 may include a metering plate 114 disposed at respective outlets 116 of the annular passageway 104 for distributing the arm portions 108 along an arc of the spaces 47 defined between the tubes 46. The metering plate 114 may include a plurality of openings 118 geometrically configured and/or spaced apart to achieve a desired distribution of the arm portions 108.

As described previously, the segments 72 may be assembled and retained in the disk 70 via their respective radially aligned openings 80. The segment openings 80 may extend through the respective arms 98 of the segment 72. The segment openings 80 may be configured to avoid intersecting either of the passageways 102, 104, such as by being formed through the arms proximate radial edges 112 of the segment 72 separate from the curved passageways 108. For, example the arms 98 may include extensions 110 extending in an upstream direction at the radial edges 112 of segment 72 through which the segment openings 80 are formed. In example embodiments of the invention, the segments 72 may be machined from a block of suitable material, or may be built up from layers of a suitable material, such as radially extending plates. In an example embodiment, techniques such as stereo lithography and/or laser sintering may be used to fabricate the segments 72.

In an aspect of the invention, the assembly 45 may also include elements disposed upstream of the segments 72 to direct fluid flows into the radial passageways 102 and into the spaces 100 between the arms 98 of the segment 72. As shown in FIGS. 4 and 5, the assembly 45 may include a flow directing element 74 disposed upstream of each segment 72 for receiving the fluid segment portion 106 and for directing the fluid segment portion 106 into the radial passageway 102 of the segment 72. In an example embodiment, the flow directing element 74 may include a transition region 120 defined between a trapezoidal cross section 122 at an upstream end of the flow directing element 74 and a rectangular cross section 124 at a downstream end of the flow directing element 74.

Figure 10:
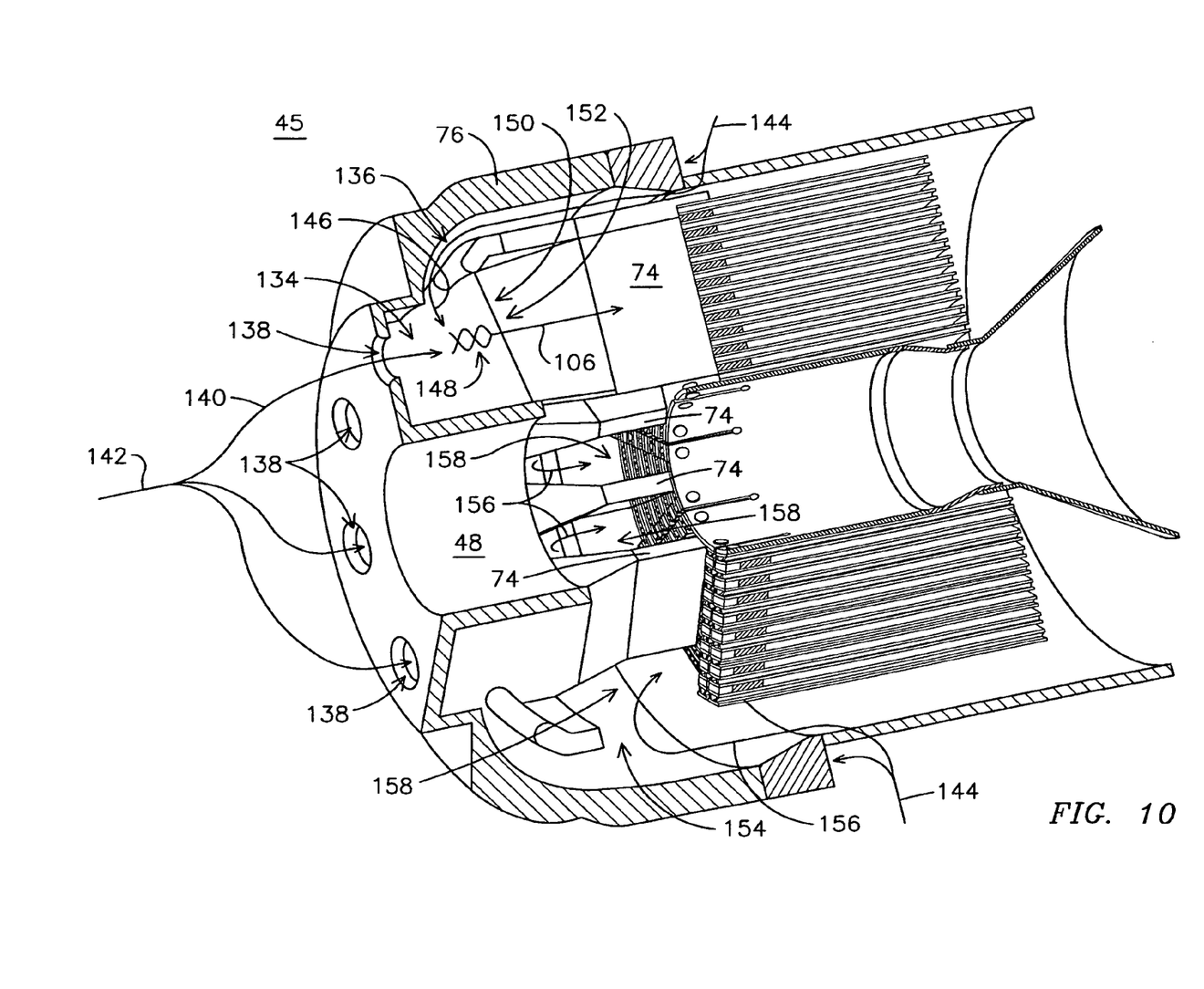
FIG. 10 is a perspective view, partially cut away, of the basket of FIG. 2 showing an example embodiment of a flow distribution element.
Figure 11:
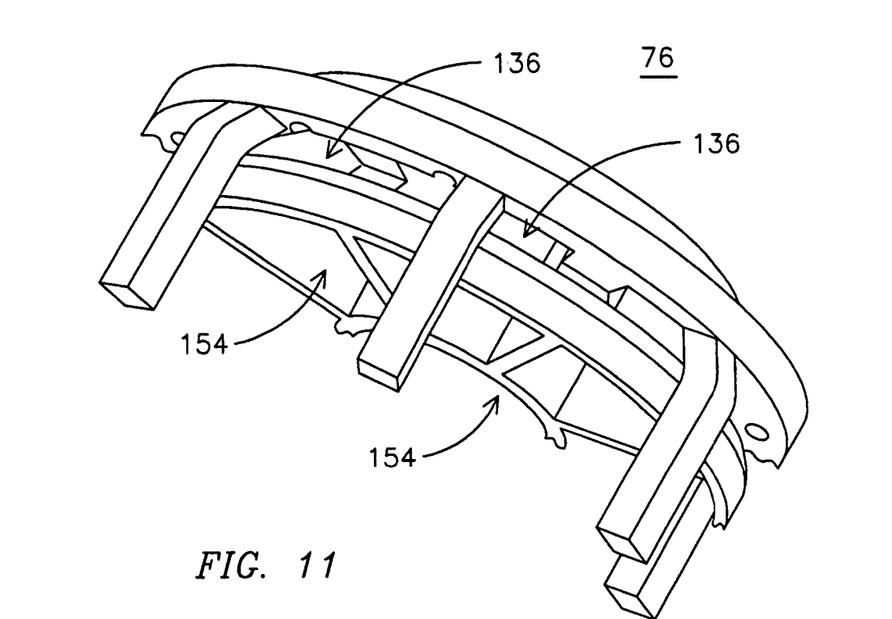
FIG. 11 is a perspective view, partially cut away, of the flow distribution element of FIG. 10.

Upstream of the flow directing element 76, the assembly 45 may include a flow distribution element 76 as shown in FIGS. 10 and 11. The flow distribution element 76 may include an annular element that defines a plurality of annularly arranged fluid mixing chambers 134 disposed around the central region 48 in communication with the respective flow directing elements 74 for delivering the respective fluid segment portions 106 therein. The mixing chamber 134 may include a first radial fluid inlet 136 for receiving a first mixing portion 146 of a first fluid flow 144, such as an oxidizer. The mixing chamber 134 may also include an axial fluid inlet 138 for receiving a second mixing portion 140 of a second fluid flow 142, such as a fuel. The axial fluid inlet 138 may be configured for receiving a fuel injector (not shown), such as conventional rocket, that is tuned for ensuring that the second fluid flow 142 is sufficiently distributed in the mixing chamber 134 to limit, for example, formation of hot spots in the downstream fluid segment portion 106 delivered to the flow directing element 74.

The mixing chamber 134 may also include a mixing region 148 for mixing the first mixing portion 146 of the first fluid flow 144 and the second mixing portion 140 of second fluid flow 142 to produce the fluid segment portion 106. The mixing chamber 134 may also include a fluid outlet 150 for discharging the fluid segment portion 106 into the flow directing element 74. The fluid outlet 150 of the mixing chamber 134 may include a geometry configured for receiving at least an upstream portion 152 of the flow directing element 74 therein effective to provide a slip fit between the fluid outlet 150 and the upstream portion 152.

The flow distribution element 76 may also include a plurality of radial fluid inlets 154 for receiving respective cooling portions 156 of the first fluid flow 144. A flowpath 158 may be provided for conducting the cooling portion 156 of the first fluid flow 144 from the radial fluid inlet 154 to the spaces 100 (see, for example, FIG. 6) between the arms 98 of the segments 72 to provide backside cooling of the tubes 46. In an example embodiment, the flowpath 158 may be defined between adjacent flow directing elements 74.

Figure 12:
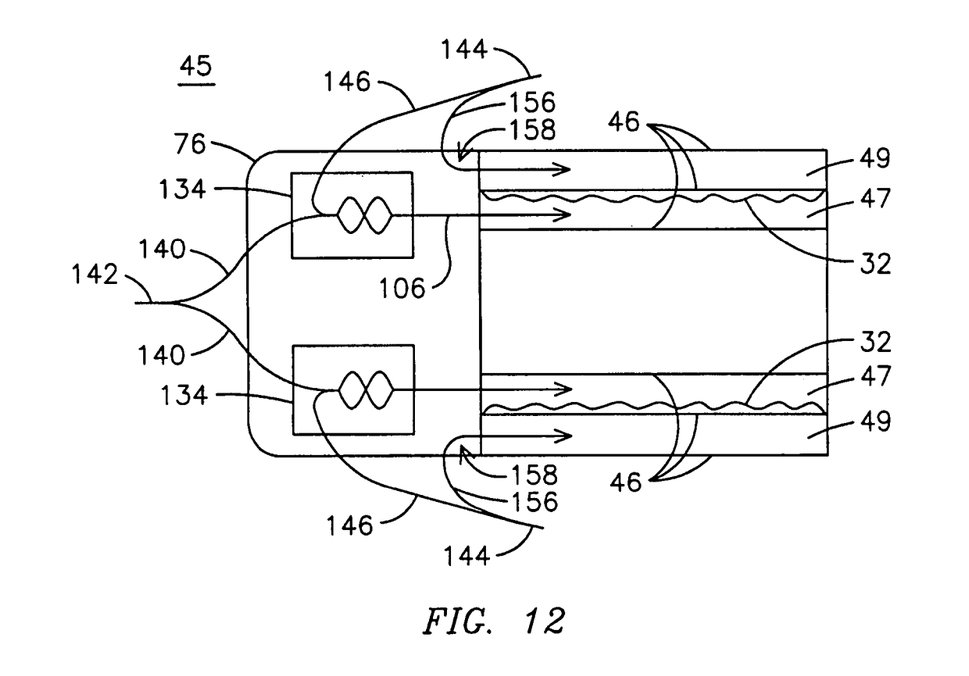
FIG. 12 is a functional diagram of an example embodiment of the assembly of FIG. 2 showing fluid flows therethrough.

FIG. 12 is a functional diagram of an example embodiment of the assembly 45 showing fluid flows therethrough. When used in a catalytic combustor, the assembly 45 may be configured for receiving a first fluid flow 144 comprising an oxidizer, such as compressed air, and a second fluid flow 142 comprising a fuel. The assembly 45 may be configured for mixing a portion of the oxidizer with the fuel to form a combustible fuel/oxidizer mixture, such as fluid segment portion 106 for delivery to catalytically active spaces 47 between the tubes 46. The assembly 45 may also be configured for directing another portion of the oxidizer into cooling spaces between the tubes 46 to provide backside cooling. For example, the assembly 45 includes flow distribution elements 76 comprising fluid mixing chambers 134, for mixing the fuel with a portion of the oxidizer to form a combustible fuel/oxidizer mixture for each fluid segment portion 106. The assembly 45 also includes flowpath 158 for directing a second portion of the oxidizer between spaces 49 between the tubes 46 to provide backside cooling of tubes 46 configured for conducting portions of the combustible fuel/oxidizer mixture.

While the preferred embodiments of the present invention have been shown and described herein, it will be obvious that such embodiments are provided by way of example only. Numerous variations, changes and substitutions will occur to those of skill in the art without departing from the invention herein. For example, the assembly 45 described above may be configured as a support apparatus for a heat exchanger having a plurality of concentrically spaced apart tubes 46. Accordingly, it is intended that the invention be limited only by the spirit and scope of the appended claims.

What is claimed is:

1. In a gas turbine engine comprising a compressor, a catalytic combustor receiving compressed air from the compressor, and a turbine receiving hot combustion gas from the catalytic combustor, an assembly of the catalytic combustor comprising:
 a plurality of separate pie-shaped segments forming a disk around a central region for retaining a plurality of tubes having a catalyst disposed on at least a portion of surfaces of the tubes in a concentrically spaced apart configuration, each segment comprising:
 a support member radially extending along an upstream face of the segment;
 a plurality of annularly curved support arms transversely attached to the support member and radially spaced apart from one another away from the central region for receiving respective upstream end portions of the tubes in arc-shaped spaces between the arms;
 a radial passageway formed in the support member for receiving a fluid segment portion; and
 a plurality of annular passageways formed in the support arms for receiving respective arm portions of the fluid segment portion from the radial passageway and for conducting the respective arm portions into corresponding annular spaces formed between the tubes retained by the disk.

2. The assembly of claim 1, wherein the segments comprise radially aligned segment openings extending through the respective arms of the segments.

3. The assembly of claim 2, wherein the segment openings are formed through the arms proximate radial edges of the segment separate from the annular passageways.

4. The assembly of claim 2, wherein the tubes comprise radially aligned tube openings formed in the upstream end portions of the tubes corresponding to the radially aligned segment openings of the segments when the upstream end portions of the tubes are disposed in the arc-shaped spaces between the arms.

5. The assembly of claim 4, further comprising retainers for securing the tubes through the radially aligned segment openings and the radially aligned tube openings.

6. The assembly of claim 5, further comprising a retaining ring disposed radially outward of the disk comprising radially aligned ring openings formed in the ring corresponding to the radially aligned segment openings and the radially aligned tube openings for receiving the retainers therethrough for at least partially retaining the segments in the disk.

7. The assembly of claim 5, wherein at least one of the tubes comprises a fastening structure for securing the retainer in the radially aligned segment openings and the radially aligned tube openings.

8. The assembly of claim 7, wherein the at least on of the tubes comprises a radially innermost tube.

9. The assembly of claim 7, wherein fastening structure comprises a first threaded region formed in at least one of the radially aligned tube openings.

10. The assembly of claim 9, wherein the retainer comprises a second threaded region for engagement with the first threaded region of the at least one radially aligned tube opening to secure the retainer therein.

11. The assembly of claim 4, wherein the upstream end portions of the tubes comprise a plurality of circumferentially spaced apart tabs.

12. The assembly of claim 11, wherein the radially aligned tube openings are formed in the tabs.

13. The assembly of claim 12, wherein at least two of the radially aligned tube openings are formed in each tab, each one of the openings formed in the tab associated with a different one of the segments of the disk.

14. The assembly of claim 13, wherein the tabs comprises at least two tab portions separated by a longitudinal slot therebetween for allowing movement of the tab portions relative to each other.

15. The assembly of claim 12, wherein the longitudinal slot comprises a stress relieving structure proximate a bottom of the slot.

16. The assembly of claim 1, further comprising a metering plate disposed at an outlet of the annular passageway for distributing the arm portion along a respective arc of the annular space formed between at least two of the tubes.

17. The assembly of claim 1, further comprising a flow directing element disposed upstream of the segment for receiving the fluid segment portion and for directing the fluid segment portion into the radial passageway of the segment.

18. The assembly of claim 17, wherein the flow directing element comprises a transition region defined between a trapezoidal cross section at an upstream end of the flow directing element and a rectangular cross section at a downstream end of the flow directing element.

19. The assembly of claim 17, further comprising a flow distribution element disposed upstream of the flow directing elements having a plurality of annularly arranged fluid mixing chambers disposed around the central region in communication with the respective flow directing elements for delivering the respective fluid segment portions thereto.

20. The assembly of claim 19, wherein the mixing chamber comprises:
- a first radial fluid inlet for receiving a first mixing portion of a first fluid flow,
- an axial fluid inlet for receiving a second mixing portion of a second fluid flow,
- a mixing region for mixing the first mixing portion of the first fluid flow and the second mixing portion of second fluid flow to produce the fluid segment portion; and
- a fluid outlet for discharging the fluid segment portion into the flow directing element.

21. The assembly of claim 20, wherein the fluid outlet of the mixing chamber comprises a geometry for receiving at least an upstream portion of the flow directing element therein effective to provide a slip fit between the fluid outlet of the mixing chamber and the upstream portion of the flow directing element.

22. The assembly of claim 20, wherein the flow distribution element further comprises a plurality of radial fluid inlets for receiving respective cooling portions of the first fluid flow.

23. The assembly of claim 22, further comprising a flowpath for conducting the cooling portion of the second fluid flow from at least one of the radial fluid inlets to the annular spaces between the arms to provide backside cooling of the tubes.

24. The assembly of claim 20, wherein the first fluid flow comprises an oxidizer.

25. The assembly of claim 20, wherein the second fluid flow comprises a fuel.

26. The assembly of claim 1, wherein the fluid segment portion comprises a fuel/oxidizer mixture.

* * * * *